US006510279B1

(12) United States Patent
Morishita (10) Patent No.: US 6,510,279 B1
(45) Date of Patent: Jan. 21, 2003

(54) AUDIO/VIDEO SYNCHRONOUS REPRODUCER ENABLING ACCURATE SYNCHRONIZATION BETWEEN AUDIO AND VIDEO AND A METHOD OF AUDIO/VIDEO SYNCHRONOUS REPRODUCTION

(75) Inventor: Takuya Morishita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/199,476

(22) Filed: Nov. 25, 1998

(30) Foreign Application Priority Data

Nov. 26, 1997 (JP) .............................. 9-324052

(51) Int. Cl.[7] .......................... H04N 7/52; H04N 7/08; H04N 5/95
(52) U.S. Cl. ............................ 386/96; 386/100; 386/85
(58) Field of Search .......................... 386/96, 98, 100, 386/104, 105, 106, 109, 111, 112, 27, 33, 46, 39, 54, 66, 113, 12, 13, 21, 71, 84, 85; H04N 7/52, 5/95, 7/08

(56) References Cited

U.S. PATENT DOCUMENTS

| 5,396,497 A | 3/1995 | Veltman | 370/100.1 |
| 5,467,139 A | 11/1995 | Lankford | 348/512 |
| 5,481,543 A | 1/1996 | Veltman | 370/94.1 |
| 5,502,573 A * | 3/1996 | Fujinami | |

FOREIGN PATENT DOCUMENTS

| EP | 0 719 054 | 6/1996 |
| JP | 6-343065 | 12/1994 |
| JP | 8-214296 | 8/1996 |
| JP | 9-9099 | 1/1997 |
| JP | 9-149411 | 6/1997 |
| JP | 10-200862 | 7/1998 |
| WO | 96/10889 | 4/1996 |

* cited by examiner

Primary Examiner—Robert Chevalier
(74) Attorney, Agent, or Firm—Foley & Lardner (57) ABSTRACT

In an audio/video synchronous reproducer for carrying out audio reproduction and video display synchronously in response to audio data and video data, an audio processing section (6) processes the audio data to produce a processed audio data amount in addition to an audio reproduction control signal. Based on the processed audio data amount, an audio time stamp deriving section (52) derives an audio time stamp equivalent value. Comparing the audio time stamp equivalent value with a video time stamp produced in a video processing section (3), a time stamp comparing section (53) produces a comparison result signal indicative of a delayed/advanced relationship between the video data and the audio data. In response to the comparison result signal, a video control arrangement (54,55) controls an operation of the video processing section.

8 Claims, 8 Drawing Sheets

FIG.8 EARLIER ART

AUDIO/VIDEO SYNCHRONOUS REPRODUCER ENABLING ACCURATE SYNCHRONIZATION BETWEEN AUDIO AND VIDEO AND A METHOD OF AUDIO/VIDEO SYNCHRONOUS REPRODUCTION

BACKGROUND OF THE INVENTION

The present invention relates to an audio/video synchronous reproducer and a method of audio/video synchronous reproduction which carry out audio reproduction and video display synchronously based on audio data and video data. Techniques of this kind are described in, for example, JP-A-06-343065 and JP-A-09-149411.

In such an audio/video synchronous reproducer, audio data and video data digitally stored in a storage medium, such as DVD-ROM, a CD-ROM and a hard disk, are read out therefrom so as to carry out audio reproduction and video reproduction based on those data via a loudspeaker and a CRT monitor, respectively. The audio/video synchronous reproducer is proposed in Japanese Patent Application No. 09-001922 which is laying-opened as JP-A-10-200862 after the Convention date of the instant patent application. This audio/video synchronous reproducer will be explained as an earlier art in more detail with reference to FIG. 8.

Figure 8:
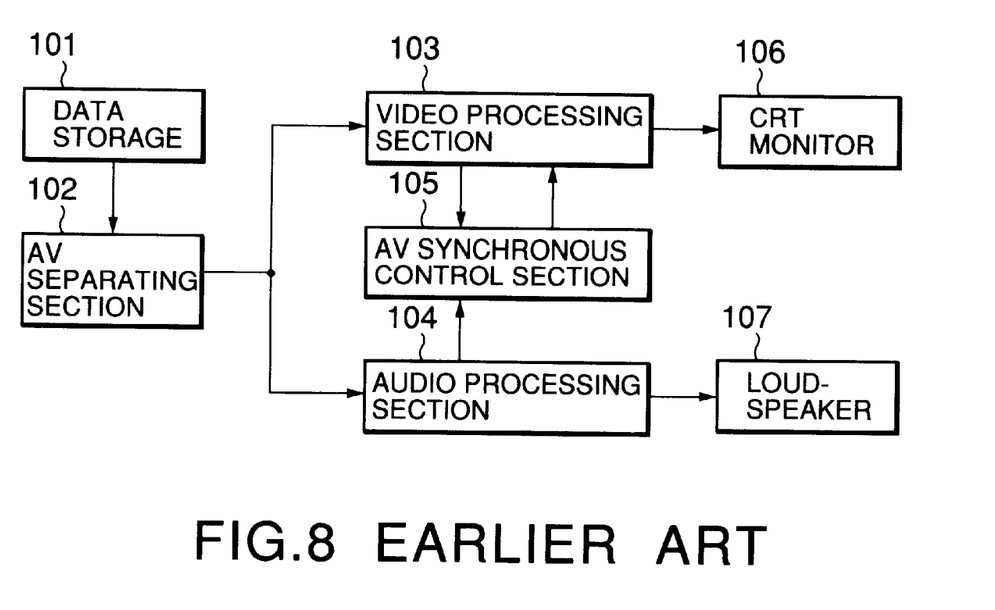
FIG. 8 is a block diagram of a conventional audio/video synchronous reproducer.

Referring to FIG. 8, the audio/video synchronous reproducer comprises a data storage 101 storing compressed and multiplexed digital audio and video data, an AV separating section 102 for reading out the data from the data storage 101 and separating them into audio data and video data, a video processing section 103 for decompressing or expanding the video data separated at the AV separating section 102, an audio processing section 104 for expanding the audio data separated at the AV separating section 102, an AV synchronous control section 105 for performing an audio/video synchronous control, a CRT monitor 106 for performing video display based on the expanded video data, and a loudspeaker 107 for performing audio reproduction based on the expanded audio data.

However, the audio/video synchronous reproducer shown in FIG. 8 does not consider the case wherein audio data and video data have their own reference times which are independent and different from each other.

Further, if there exists mismatching between time stamps included in video data and the number of video frames, the expected reproduction result can not be achieved. The reason for this is that time stamps included in audio data or video data are not used.

Further, there rises a case wherein the accuracy of a reference time to be used for audio/video synchronization is not sufficient. The reason for this is that a processed audio data amount if used as a reference time as it is. If the reference time accuracy is not sufficient, there rises a case wherein the accuracy of the processed audio data amount is lowered. As a result, the accuracy of the audio/video synchronization is also lowered.

SUMMARY OF THE INVENTION

It is therefore an object of the present invention to provide an improved audio/video synchronous reproducer that can eliminate one or more of the disadvantages inherent in the foregoing conventional technique.

It is another object of the present invention to provide an improved method of audio/video synchronous reproduction that can eliminate one or more of the disadvantages inherent in the foregoing conventional technique.

Other object of the present invention will become clear as the description proceeds.

According to one aspect of the present invention, there is provided an audio/video synchronous reproducer for carrying out audio reproduction and video display synchronously in response to audio data and video data. The audio/video synchronous reproducer comprises video processing means for processing the video data to produce a video display control signal and a video time stamp, video display means connected to the video processing means for performing the video display in accordance with the video display control signal, audio processing means for processing the audio data to produce an audio reproduction control signal and a processed audio data amount, audio reproducing means connected to the audio processing means for performing the audio reproduction in accordance with the audio reproduction control signal, video time stamp detecting means connected to the video processing means for detecting the video time stamp, audio time stamp deriving means connected to the audio processing means for deriving an audio time stamp equivalent value based on the processed audio data amount, time stamp comparing means connected to the video time stamp detecting means and the audio time stamp deriving means for comparing the video time stamp with the audio time stamp equivalent value to produce a comparison result signal indicative of a delayed/advanced relationship between the video data and the audio data, and video control means connected to the video processing means and the timestamp comparing means for controlling an operation of the video processing means in response to the comparison result signal.

According to another aspect of the present invention, there is provided an audio/video synchronous reproducer comprising an AV synchronous control section for performing comparison between a video time stamp assigned to video data and an audio time stamp equivalent value derived based on a processed amount of audio data, the AV synchronous control section controlling video display according to a result of the comparison so as to be synchronous with audio reproduction.

According to still another aspect of the present invention, there is provided a method of audio/video synchronous reproduction comprising the steps of detecting a video time stamp assigned to video data; deriving an audio time stamp equivalent value based on a processed amount of audio data; performing comparison between the video time stamp and the audio time stamp equivalent value; and controlling video display according to a result of the comparison so as to be synchronous with audio reproduction.

DESCRIPTION OF THE PREFERRED EMBODIMENTS

Figure 1:
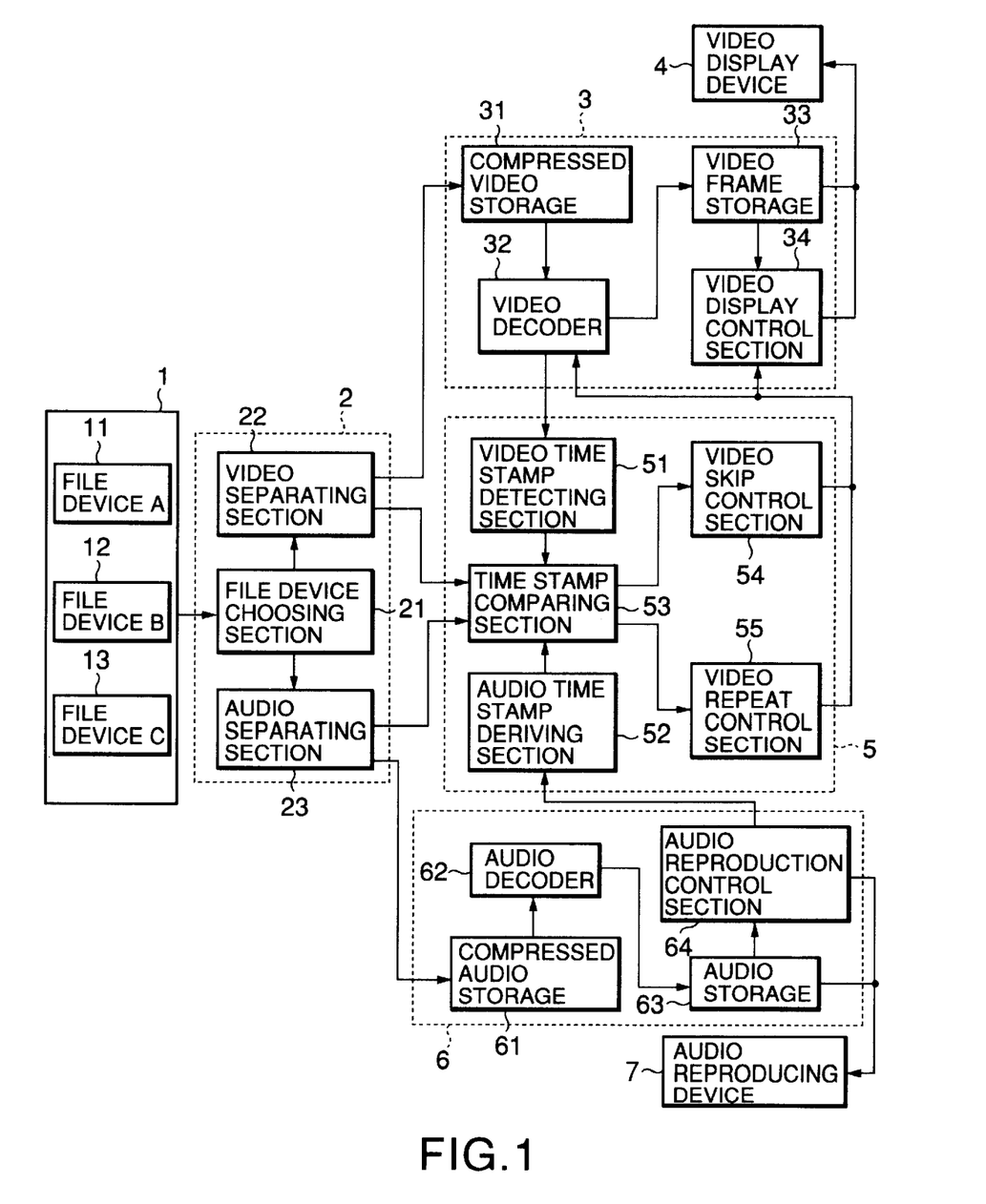
FIG. 1 is a block diagram of an audio/video synchronous reproducer according to a first preferred embodiment of the present invention.

Referring now to FIG. 1, an audio/video synchronous reproducer will be described according to the first preferred embodiment of the present invention.

The audio/video synchronous reproducer comprises a file device 1, such as a CD-ROM drive, a DVD-ROM drive and a hard disk drive, an AV separating section 2 for reading out data from the file device 1 and separating them into video data, audio data and other data, a video processing section 3 for processing the video data separated at the AV separating section 2, and a video display device 4 such as a CRT display for displaying the video data processed at the video processing section 3. The reproducer further comprises an AV synchronous control section 5 for carrying out a synchronous reproduction control of the video data and the audio data, an audio processing section 6 for processing the audio data separated at the AV separating section 2, and an audio reproducing device 7 for carrying out audio reproduction based on the audio data processed at the audio processing section 6. In this embodiment, the file device 1 includes a plurality of file devices A, B, C, but there is no particular limitation to the number of file devices, which may also be one.

The AV separating section 2 comprises a file device choosing section 21 for choosing one or more of the file devices A to C to read out data therefrom, a video separating section 22 for separating only video data from the read-out data, and an audio separating section 23 for separating only audio data from the read-out data.

The video processing section 3 comprises a compressed video storage 31, a video decoder 32, a video frame storage 33 and a video display control section 34. The compressed video storage 31 stores the video data separated at the video separating section 22. The video decoder 32 carries out a decompressing or expanding process when the video data stored in the compressed video storage 31 is compressed, and stores expanded video data per frame into the video frame storage 33. The video display control section 34 transfers the expanded video data per frame to the video display device 4, using a video time stamp given to the expanded video data as a reference time.

The AV synchronous control section 5 compresses a video time stamp detecting section 51, an audio time stamp deriving section 52, a time stamp comparing section 53, a video skip control section 54 and a video repeat control section 55. The video time stamp detecting section 52 obtains from the video decoder 32 a video time stamp of video data being processed. The audio time stamp deriving section 52 obtains from an audio reproduction control section 64 an amount of audio data processed up to then for audio reproduction and converts it into an audio time stamp equivalent value. The time stamp comparing section 53 compares the video time stamp from the video time stamp detecting section 51 and the audio time stamp equivalent value from the audio time stamp deriving section 52 and produces a comparison result signal. Depending on the comparison result signal, the video skip control section 54 or the video repeat control section 55 controls a video frame display. The video skip control section 54 and the video repeat control section 55 cooperatively constitute a video display control means.

The audio processing section 6 comprises a compressed audio storage 61, an audio decoder 62, an audio storage 63 and an audio reproduction control section 64. The compressed audio storage 61 stores the audio data separated at the audio separating section 23. The audio decoder 62 carries out an expanding process when the audio data stored in the compressed audio storage 61 is compressed, and stores expanded audio data into the audio storage 63. The audio reproduction control section 64 transfers the expanded audio data to the audio reproducing device 7.

Figure 2:
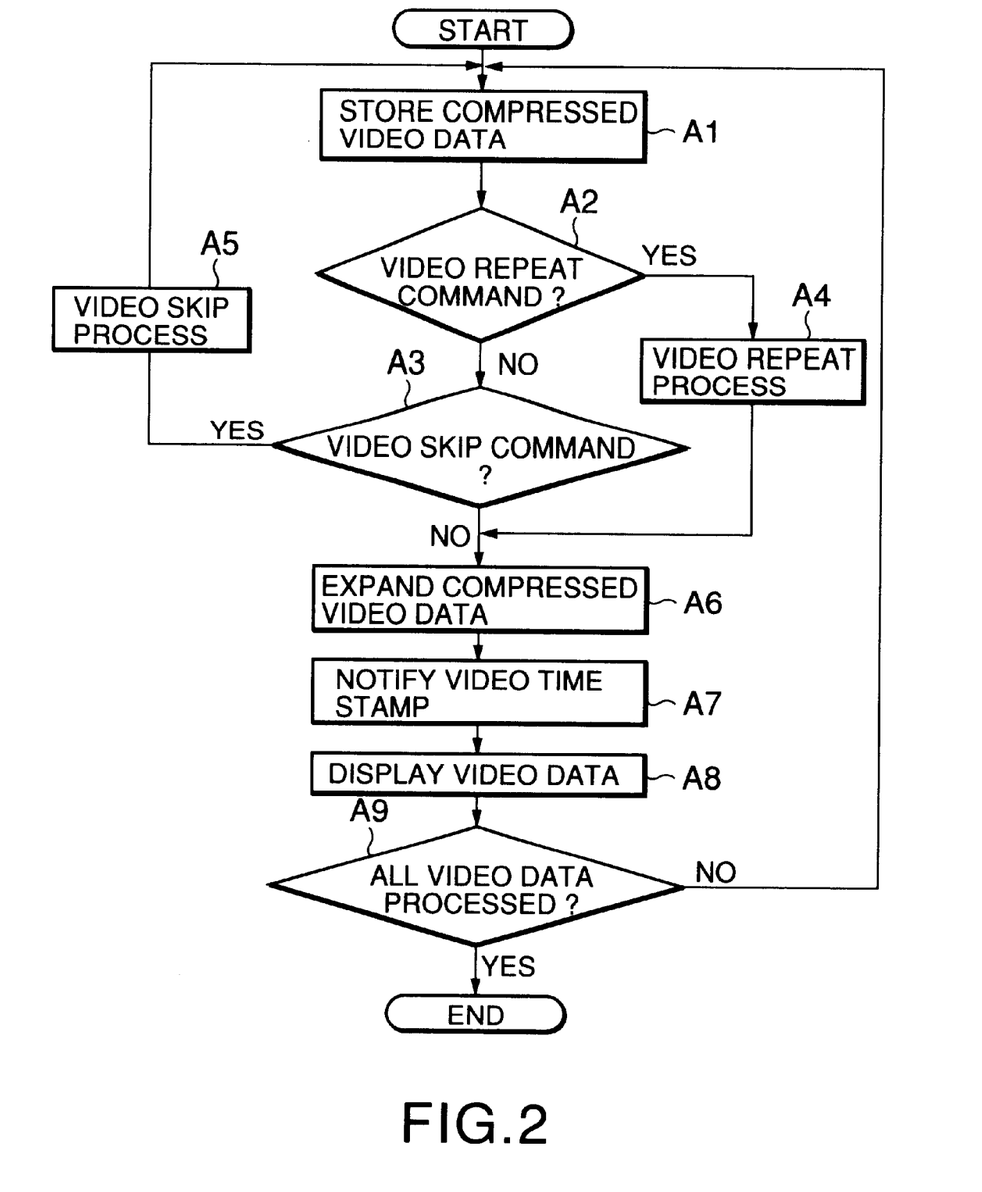
FIG. 2 is a flowchart for explaining an operation of the audio/video synchronous reproducer shown in FIG. 1.

Now, referring also to FIG. 2, an operation of the audio/video synchronous reproducer shown in FIG. 1 will be described in detail.

The video processing section 3, the AV synchronous control section 5 and the audio processing section 6 operate independently of each other, and may be realized by specific circuits or a software control based on time-division multi-task processing or the like.

The file device choosing section 21 chooses one or more of the file devices A to C from the file device 1 designated by an operator or the like for video data and audio data, respectively, to read out compressed data therefrom and send the read-out compressed data to the video separating section 22 and the audio separating section 23. The video separating section 22 separates compressed video data from the read-out compressed data and stores the compressed video data into the compressed video storage 31 (step A1). At this time, if it is immediately after the start of the reproduction, the video separating section 22 retrieves a first video time stamp and sends it to the time stamp comparing section 53.

The video display control section 34 checks whether a command of video repeat, i.e. a video repeat command signal, is received from the video repeat control section 55 (step A2). If the video repeat command signal is received, the video display control section 34 controls the video display device 4 to continue displaying a video frame being displayed for a designated time (step A4).

Then, the video display control section 34 checks whether a command of video skip, i.e. a video skip command signal, is received from the video skip control section 54 (step A3). If the video skip command signal is received, the video display control section 34 commands the video decoder 32 to skip a video expanding process corresponding to a designated time period (step A5).

The video decoder 32 expands the compressed video data stored in the compressed video storage 31 and stores expanded video data into the video frame storage 33 (step A6). At this time, the video decoder 32 extracts a video time stamp from the video data and notifies it to the video time stamp detecting section 51 (step A7). In response to the video stamp notification, the AV synchronous control section 5 starts an AV synchronous process. The video display control section 34 displays the expanded video data on the video display device 4 (step A8). Execution of steps A1 to A8 is repeated until all the video data have been processed (step A9).

Figure 3:
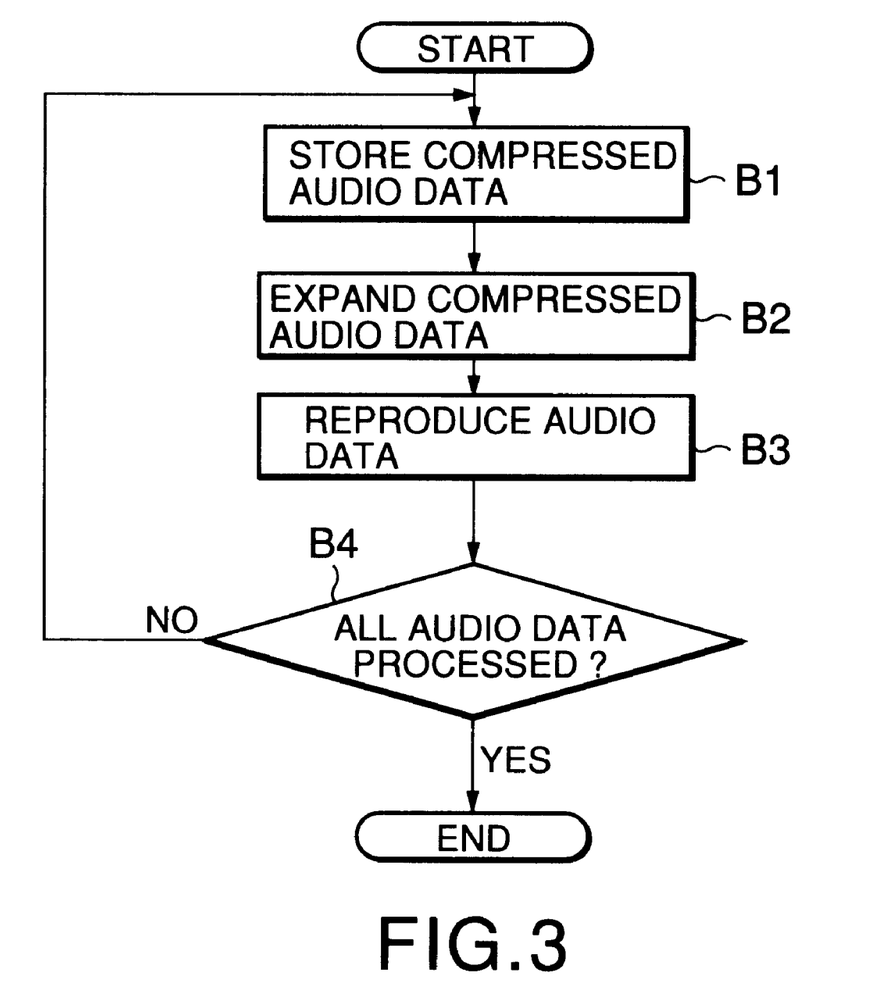
FIG. 3 is a flowchart for explaining an operation of an audio processing section included in the audio/video synchronous reproducer shown in FIG. 1.

Now, referring also to FIG. 3, an operation of the audio processing section 6 will be described.

The audio separating section 23 separates compressed audio data from the foregoing compressed data read out from the file device 1 and stores the compressed audio data into the compressed audio storage 61 (step B1). At this time, if it is immediately after the start of the reproduction, the audio separating section 23 retrieves a first audio time stamp and feeds it to the time stamp comparing section 53.

The audio decoder 62 expands the compressed audio data stored in the compressed audio storage 61 and stores expanded audio data into the audio storage 63 (step B2). The audio reproduction control section 64 controls the audio reproducing device 7 to carry out audio reproduction based on the audio data stored in the audio storage 63 (step B3). Execution of steps B1 to B3 is repeated until all the audio data have been processed (step B4).

Figure 4:
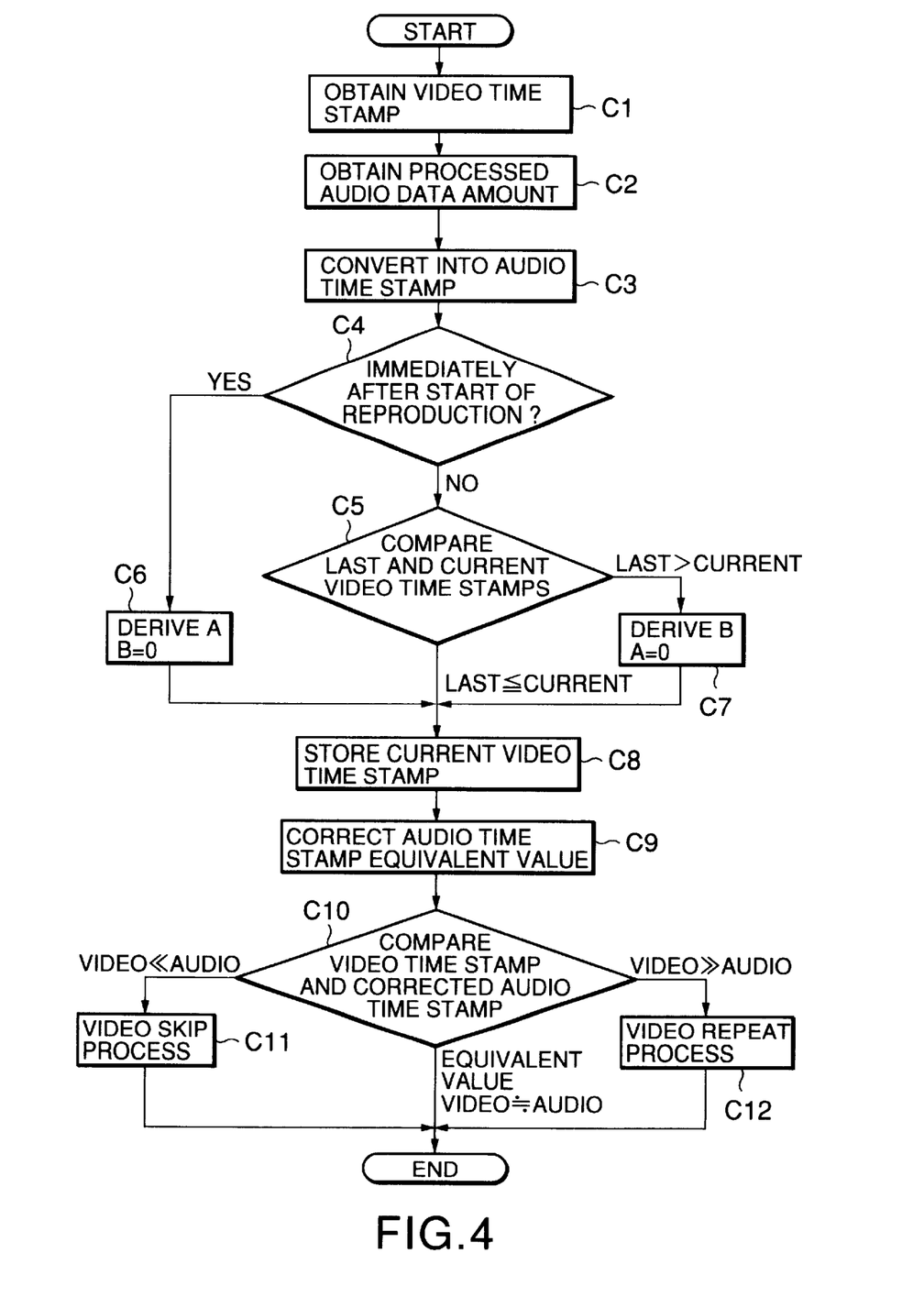
FIG. 4 is a flowchart for explaining an operation of an AV synchronous control section included in the audio/video synchronous reproducer shown in FIG. 1.

Now, referring also to FIG. 4, an operation of the AV synchronous control section 5 will be described.

The video time stamp detecting section 51 obtains a video time stamp of video data being processed from the video decoder 32 (step C1). The audio time stamp deriving section 52 obtains from the audio reproduction control section 64 an amount of audio data processed up to then for audio reproduction (step C2) and converts it into an audio time stamp equivalent value (step C3).

The audio time stamp equivalent value can be derived by the following conversion equation:

$$ATSEV = PADA \div (SF \times QB \times C) \quad (1)$$

wherein ATSEV represents an audio time stamp equivalent value, PADA an audio data amount processed up to then for reproduction from the start of the reproduction, SF a sampling frequency, QB the number of quantization bits, and C the number of channels.

The sampling frequency, the number of quantization bits and the number of channels are obtained from a format of audio reproduced at the audio reproducing device 7.

For example, assuming that, with respect to the audio data, the sampling frequency is 48 KHz, the number of quantization bits is 16, the number of channels is 2, the unit of the data amount is byte, and the unit of a time stamp is 90 KHz (in case that a video compression technique is MPEG), the conversion equation is given by:

$$ATSEV = PADA \times 8 \times 90000 \div (48000 \times 16 \times 2). \quad (2)$$

Then, the time stamp comparing section 53 checks whether it is the first synchronous control from the start of the reproduction (step C4). If positive, the audio time stamp deriving section 52 derives a correction value A (step C6). The correction value A is given by:

$$A = FVTS - ATSEV \quad (3)$$

wherein FVTS represents a first time stamp in video data.

The correction value A is necessary when audio data is not processed for reproduction from the beginning, or when reference times of video data and audio data differ from each other.

On the other hand, if negative at step C4, i.e. if it is not the first synchronous control from the start of the reproduction, the time stamp comparing section 53 compares a last video time stamp and a current video time stamp (step C5). If the last video time stamp is greater than the current video time stamp, the audio time stamp deriving section 52 derives a correction value B (step C7). The correction value B is given by:

$$B = CVTS - ATSEV \quad (4)$$

wherein CVTS represents a current video time stamp.

The correction value B is necessary for achieving AV synchronization when processing data whose time stamp does not simply increase.

The time stamp comparing section 53 stores the current video time stamp (step C8). This stored value is used as a last video time stamp in the next execution of step C5.

The time stamp comparing section 53 corrects the audio time stamp equivalent value using the correction values A and B (step C9) to derive a corrected audio time stamp equivalent value. The corrected audio time stamp equivalent value is given by:

$$CATSEV = ATSEV + A - B \quad (5)$$

wherein CATSEV represents a corrected audio time stamp equivalent value.

Then, the time stamp comparing section 53 compares the corrected audio time stamp equivalent value and the video time stamp with each other (step C10). If the video time stamp and the corrected audio time stamp equivalent value are equal to each other, nothing is done because synchronization is realized between the video and audio data. For preventing the synchronization process from being frequently carried out, it is arranged that the comparison process at step C10 is executed with a certain time interval, for example, with a time interval corresponding to a reproducing time of several video frames. If the video time stamp is smaller than the corrected audio time stamp equivalent value, it means that the process of video data is delayed so that the video skip control section 54 commands the video decoder 32 and the video display control section 34 to skip the expanding process and the display updating process of the video data corresponding to a time delay in the process of video data (step C11). On the other hand, if the video time stamp is greater than the corrected audio time stamp equivalent value, it means that the process of video data is advanced so that the video repeat control section 55 commands the video decoder 32 and the video display control section 34 to temporarily stop the expanding process and the display updating process of the video data corresponding to an advanced time (step C12).

According to the audio/video synchronous reproducer shown in FIG. 1, the audio processing system and the video processing system can realize the exact AV synchronization on the fully independent data. This is achieved by provision of the audio time stamp deriving section 52 which converts a processed audio data amount into a value equivalent to a time stamp in the video processing system.

Further, even if intervals between the time stamps are not constant or the time stamp does not simply increase, the reproduction can be carried out continuously without intermission. This is achieved by provision of the time stamp comparing section 53.

Figure 5:
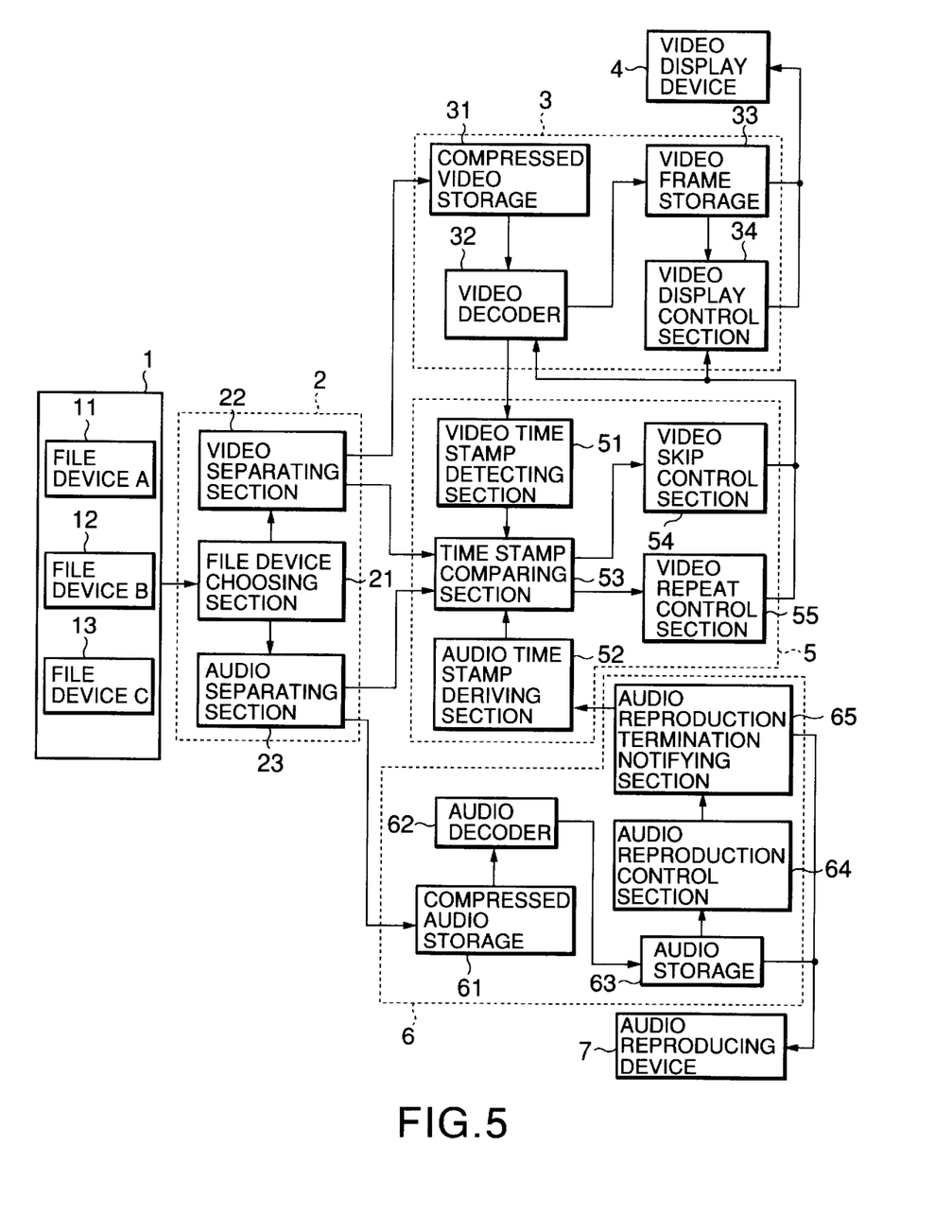
FIG. 5 is a block diagram of an audio/video synchronous reproducer according to a second preferred embodiment of the present invention.

Referring now to FIG. 5, an audio/video synchronous reproducer according to the second preferred embodiment of the present invention will be described. In FIG. 5, those components corresponding to the components in FIG. 1 are assigned the same reference signs so as to omit explanation thereof. In the audio/video synchronous reproducer shown in FIG. 5, the audio processing section 6 further includes an audio reproduction termination notifying section 65 as compared with the audio/video synchronous reproducer shown in FIG. 1.

Figure 6:
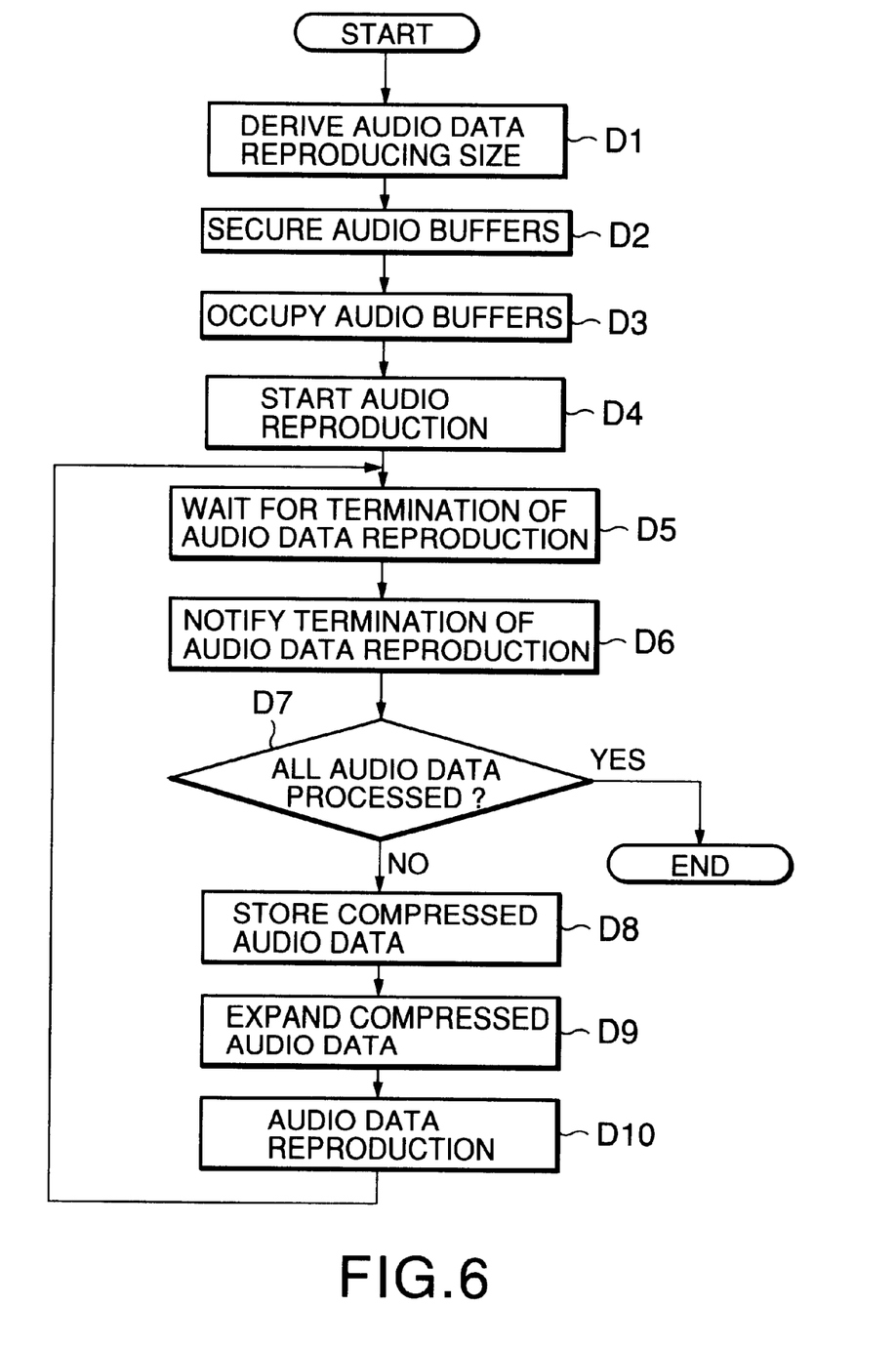
FIG. 6 is a flowchart for explaining an operation of an audio processing section included in the audio/video synchronous reproducer shown in FIG. 5.

Referring also to FIG. 6, an operation of the audio processing section 6 will be described.

First, the audio reproduction control section 64 derives an audio data reproducing size to be processed in one reproducing process (equivalent to a data amount corresponding to a reproducing time of one video frame) based on an audio reproducing format and a video frame rate, using the following equation (step D1):

$$ADRS = SF \times QB \times C \div FR \quad (6)$$

wherein ADRS represents an audio data reproducing size, SF a sampling frequency, QB the number of quantization bits, C the number of channels, and FR a video frame rate.

For example, assuming that, with respect to the audio data, the sampling frequency is 48 KHz, the number of quantization bits is 16, the number of channels is 2, the unit of the data amount is byte, and the video frame rate is 30 frame/sec, the audio data reproducing size is given by:

$$ADRS = 48000 \times 16 \div 8 \times 2 \div 30 = 6400 \text{ (bytes)} \quad (7)$$

The audio reproduction control section 64 secures a plurality of audio buffers on the audio storage 63, each having the size thus derived and set as one block (step D2).

The audio decoder 62 expands the compressed audio data corresponding to a data amount to occupy all the secured audio buffers, and thus stores them in the audio storage 63 (step D3). The audio reproduction control section 64 sends the expanded audio data per block to the audio reproducing device 7 to start audio reproduction (step D4).

The audio reproduction control section 64 waits for termination of the audio reproduction of one block (step D5). The audio reproduction termination notifying section 65 notifies the audio time stamp deriving section 52 of the termination of audio reproduction of one block, i.e. corresponding to one video frame (step D6). The audio reproduction control section 64 further judges whether all the audio data have been processed (step D7).

If negative at step D7, the audio separating section 23 separates compressed audio data from compressed data read out from the file device 1, and stores the compressed audio data into the compressed audio storage 61 (step D8).

The audio decoder 62 expands the compressed audio data stored in the compressed audio storage 61 corresponding to one block and stores expanded audio data into the audio storage 63 (step D9). The audio reproduction control section 64 controls the audio reproducing device 7 to carry out audio reproduction based on the audio data stored in the audio storage 63 (step D10). Execution of steps D5 to D10 is repeated until all the audio data have been processed (step D7).

Figure 7:
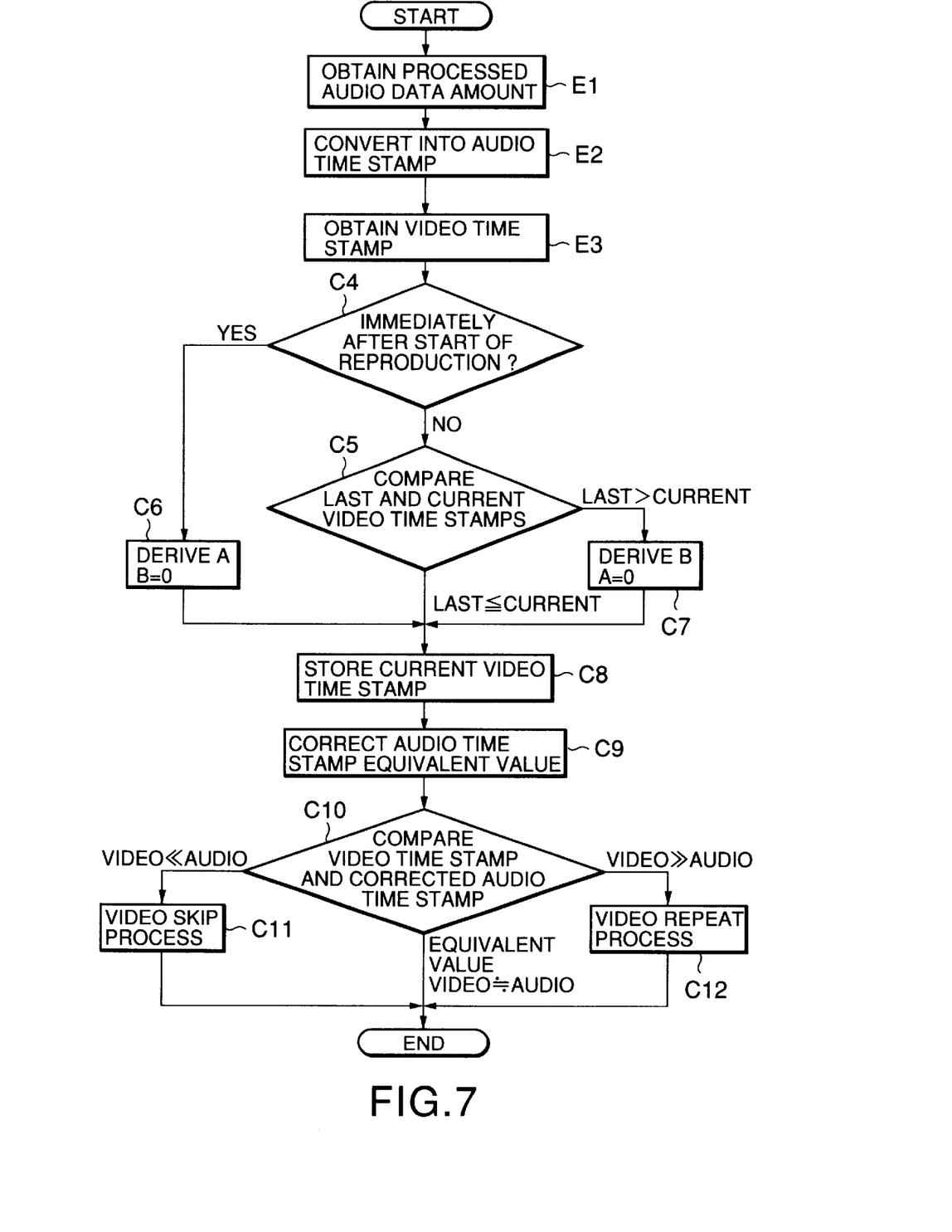
FIG. 7 is a flowchart for explaining an operation of an AV synchronous control section included in the audio/video synchronous reproducer shown in FIG. 5.

Now, referring also to FIG. 7, an operation of the AV synchronous control section 5 will be described.

The AV synchronous control section 5 starts processing in response to the notification of the termination of audio reproduction of one block received from the audio reproduction termination notifying section 65. The audio time stamp deriving section 52 obtains from the audio reproduction control section 64 an amount of audio data processed up to then for reproduction (step E1), and converts it into an audio time stamp equivalent value (step E2). The audio time stamp equivalent value is given by the foregoing equations (1) and (2). The audio time stamp equivalent value thus derived always becomes integer times a producing time of one video frame. Therefore, it is possible to carry out the exact AV synchronous process based on the audio reproducing time.

The video time stamp detecting section 51 obtains from the video decoder 32 a video time stamp of video data being processed (step E3).

Operations at the following steps C4 to C12 are the same as those in the foregoing first preferred embodiment, so that explanation thereof is omitted.

Similarly, since an operation of the video processing section 3 is the same as that in the foregoing first preferred embodiment, explanation thereof is omitted.

In the audio/video synchronous reproducer according to the second preferred embodiment, as compared with that in the foregoing first preferred embodiment, the exact AV synchronization can be achieved even when the audio data amount processed for reproduction up to a given time can not be obtained or can be obtained but with poor accuracy. This is realized by provision of the audio reproduction termination notifying section which makes it possible to obtain an exact reference time being integer times a producing time of one video frame.

According to the foregoing first and second preferred embodiments, since the processed audio data amount is converted into a value equivalent to a time stamp in the video processing system, the AV synchronization can be achieved even with such data having different reference times for audio and video data.

What is claimed is:

1. An audio/video synchronous reproducer for carrying out audio reproduction and video display synchronously in response to audio data and video data, said audio/video synchronous reproducer comprising:

video processing means for processing said video data to produce a video display control signal and a video time stamp;

video display means connected to said video processing means for performing said video display in accordance with said video display control signal;

audio processing means for processing said audio data to produce an audio reproduction control signal and a processed audio data amount;

audio reproducing means connected to said audio processing means for performing said audio reproduction in accordance with said audio reproduction control signal;

video time stamp detecting means connected to said video processing means for detecting said video time stamp;

audio time stamp deriving means connected to said audio processing means for deriving an audio time stamp equivalent value based on said processed audio data amount and not based on an actual audio time stamp;

time stamp comparing means connected to said video time stamp detecting means and said audio time stamp deriving means for comparing said video time stamp with said audio time stamp equivalent value to produce a comparison result signal indicative of a delayed/advanced relationship between said video data and said audio data; and video control means connected to said video processing means and said timestamp comparing means for controlling an operation of said video processing means in response to said comparison result signal.

2. An audio/video synchronous reproducer as claimed in claim 1, further comprising:

video separating means connected to said video processing means for separating the video data from data read out from a file device and feeding it to said video processing means; and audio separating means connected to said audio processing means for separating the audio data from the data read out from said file device and feeding it to said audio processing means.

3. An audio/video synchronous reproducer as claimed in claim 1, wherein said video control means comprises:

video skip control means for producing a video skip command signal when said comparison result signal represents the video data being delayed; and video repeat control means for producing a video repeat command signal when said comparison result signal represents the audio data being delayed, said video processing means skipping a process of the video data according to said video skip command signal and stopping the process of the video data according to said video repeat command signal.

4. An audio/video synchronous reproducer as claimed in claim 1, wherein said audio time stamp deriving means derives said audio time stamp equivalent value using an equation given by:

$$ATSEV = PADA \div (SF \times QB \times C)$$

wherein ATSEV represents said audio time stamp equivalent value, PADA representing said processed audio data amount, SF representing a sampling frequency, QB representing the number of quantization bits, and C represents the number of channels.

5. An audio/video synchronous reproducer as claimed in claim 4, wherein said audio time stamp deriving means comprises means for correcting said audio time stamp equivalent value when said video time stamp is discontinuous immediately after the start of the reproduction.

6. An audio/video synchronous reproducer as claimed in claim 4, wherein said processed audio data amount is equivalent to a value which is integer times a reproducing time of one video frame.

7. An audio/video synchronous reproducer comprising an AV synchronous control section for performing comparison between a video time stamp assigned to video data and an audio time stamp equivalent value derived based on a processed amount of audio data and not based on an actual audio time stamp, said AV synchronous control section controlling video display in accordance with a result of said comparison so as to be synchronous with audio reproduction.

8. A method of audio/video synchronous reproduction comprising the steps of:
 detecting a video time stamp assigned to video data;
 deriving an audio time stamp equivalent value based on a processed amount of audio data and not based on an actual audio time stamp;
 performing comparison between said video time stamp and said audio time stamp equivalent value; and
 controlling video display in accordance with a result of said comparison so as to be synchronous with audio reproduction.

* * * * *